(12) United States Patent
Suzuki

(10) Patent No.: US 7,764,441 B2
(45) Date of Patent: Jul. 27, 2010

(54) LENS HAVING VIBRATION PROOF FUNCTION AND IMAGING APPARATUS

(75) Inventor: Takashi Suzuki, Saitama (JP)

(73) Assignee: Fujinon Corporation, Saitama-Shi (JP)

( * ) Notice: Subject to any disclaimer, the term of this patent is extended or adjusted under 35 U.S.C. 154(b) by 0 days.

(21) Appl. No.: 12/354,321

(22) Filed: Jan. 15, 2009

(65) Prior Publication Data
US 2009/0190239 A1 Jul. 30, 2009

(30) Foreign Application Priority Data
Jan. 29, 2008 (JP) ............... P2008-018093

(51) Int. Cl.
*G02B 13/02* (2006.01)
*G02B 27/64* (2006.01)
(52) U.S. Cl. ..................... 359/745; 359/557
(58) Field of Classification Search ........... 359/557, 359/745, 746, 747, 748
See application file for complete search history.

(56) References Cited
U.S. PATENT DOCUMENTS 5,646,779 A * 7/1997 Sato ............... 359/557
5,739,953 A * 4/1998 Sato ............... 359/557
6,115,188 A * 9/2000 Nishio et al. ........ 359/690
6,728,033 B2 * 4/2004 Hayakawa ........... 359/557

FOREIGN PATENT DOCUMENTS
JP 3590845 B2 10/1995

* cited by examiner

*Primary Examiner*—David N Spector
(74) *Attorney, Agent, or Firm*—Birch, Stewart, Kolasch & Birch, LLP

(57) ABSTRACT

A telephoto lens having a vibration proof function is provided and includes: in order from an object side of the telephoto lens, a first lens group having a positive refractive power; a second lens group having a negative refractive power; and a third lens group having a positive refractive power. The second lens group is moved along an optical axis thereof to perform focusing. The third lens group includes a 3a-th group having a positive refractive power and a 3b-th group having a negative refractive power in the order from the object side. The 3a-th group is moved in a direction orthogonal to the optical axis to correct an image vibration of a taken image. The telephoto lens satisfies a specific conditional expression.

9 Claims, 19 Drawing Sheets

EXAMPLE 1

| EXAMPLE 1 : BASIC LENS DATA |||||||
|---|---|---|---|---|---|---|
| | Si | Ri | di | Ndj | νdj | Dk |
| G1 | 1 | 1500 | 5.00 | 1.51680 | 64.2 | 120.4 (D1) |
| | 2 | 1500 | 1.00 | | | |
| | 3 | 179.07 | 18.09 | 1.49782 | 82.5 | |
| | 4 | -920.68 | 10.77 | | | |
| | 5 | 185.07 | 16.62 | 1.49782 | 82.5 | |
| | 6 | -452.05 | 1.04 | | | |
| | 7 | -435.27 | 5.00 | 1.78800 | 47.4 | |
| | 8 | 287.74 | 98.05 | | | |
| | 9 | 94.676 | 5.00 | 1.69680 | 55.5 | |
| | 10 | 56.528 | 13.12 | 1.49782 | 82.5 | |
| | 11 | 458.17 | d11 (VA) | | | |
| G2 | 12 | -1537 | 3.00 | 1.83400 | 37.2 | |
| | 13 | 73.074 | 4.24 | | | |
| | 14 | -122.52 | 4.84 | 1.84666 | 23.8 | |
| | 15 | -44.264 | 3.00 | 1.69680 | 55.5 | |
| | 16 | 1489.6 | d16 (VA) | | | |
| | 17 (AD) | ∞ | 7.00 | | | |
| G3a | 18 | 357.29 | 6.28 | 1.48749 (Nb) | 70.4 (νb) | 42.5 (D3) |
| | 19 | -59.63 | 0.50 | | | |
| | 20 | -60.598 | 1.80 | 1.84666 (Nc) | 23.8 (νc) | |
| | 21 | -147.5 | 7.84 | | | |
| | 22 | 158-31 | 3.85 | 1.80100 (Na) | 35.0 (νa) | |
| | 23 | -313.68 | 28.00 | | | |
| G3b | 24 | 134.85 | 2.50 | 1.80100 | 35.0 | |
| | 25 | 49.355 | 5.09 | 1.62004 | 36.3 | |
| | 26 | -1227.6 | 0.30 | | | |
| | 27 | 382-23 | 2.50 | 1.48749 | 70.4 | |
| | 28 | 74.239 | 25.00 | | | 32.8 |
| GF | 29 | ∞ | 2.00 | 1.51680 | 64.2 | |
| | 30 | ∞ | | | | |

Si : SURFACE NUMBER
Ri : RADIUS OF CURVATURE
di : SURFACE SPACING
Ndj : REFRACTIVE INDEX
νdj : ABBE NUMBER
Dk : EFFECTIVE DIAMETER
VA : VARIABLE
AD : APERTURE DIAPHRAGM

FIG.6

| EXAMPLE 1 : VARIOUS DATA | | |
|---|---|---|
| f | 489.78 | |
| Bf | 82.68 | |
| Fno | 4.08 | |
| ANGLE OF VIEW :2ω | 5.0 DEGREE | |
| | INFINITE POINT | NEAR POINT (5m) |
| d11 | 39.04 | 49.88 |
| d16 | 24.02 | 13.18 |
| f3 | 133.97 | |
| D1 | 120.4 | |
| D3 | 42.5 | |
| CE (1) | 1.290 | |
| CE (2) | 0.314 | |
| CE (3) | 1.84666 | |
| CE (4) | 35.4 | |
| CE (5) | 23.8 | |
| VPA | ± 0.25 DEGREE | |
| IMA | ± 2.14mm | |
| MAOVPG | ± 1.53mm | |
| IMA/MAOVPG | 1.4 TIMES | |

CE : CONDITIONAL EXPRESSION
VPA : VIBRATION PROOF AMOUNT
IMA : IMAGE MOVING AMOUNT
MAOVPG : MOVING AMOUNT OF VIBRATION PROOF GROUP
IMA/MAOVPG : IMAGE MOVING AMOUNT / MOVING AMOUNT OF
             VIBRATION PROOF GROUP

FIG.7

| EXAMPLE 2 : BASIC LENS DATA ||||||
|---|---|---|---|---|---|
| Si | Ri | di | Ndj | νdj | Dk |
| 1 | 1500 | 5.00 | 1.51680 | 64.2 | 122.6 (D1) |
| 2 | 1500 | 1.00 | | | |
| 3 | 180.82 | 15.55 | 1.49782 | 82.5 | |
| 4 | -824.19 | 2.24 | | | |
| 5 | 187.13 | 14.54 | 1.49782 | 82.5 | |
| 6 | -528.6 | 2.81 | | | |
| 7 | -471.43 | 5.10 | 1.78800 | 47.4 | |
| 8 | 265.37 | 133.85 | | | |
| 9 | 73.273 | 4.45 | 1.78800 | 47.4 | |
| 10 | 49.846 | 13.06 | 1.49782 | 82.5 | |
| 11 | 449.85 | d11 ( VA ) | | | |
| 12 | -286.33 | 2.98 | 1.83481 | 42.7 | |
| 13 | 62.838 | 3.05 | | | |
| 14 | -164.01 | 4.65 | 1.84666 | 23.8 | |
| 15 | -36.14 | 2.98 | 1.65844 | 50.9 | |
| 16 | 150.39 | d16 ( VA ) | | | |
| 17 (AD) | ∞ | 4.25 | | | |
| 18 | 80.761 | 6.54 | 1.48749 (Nb) | 70.4 (νb) | 36.5 (D3) |
| 19 | -51.029 | 1.60 | | | |
| 20 | -49.707 | 1.28 | 1.84666 (Nc) | 23.8 (νc) | |
| 21 | -118.29 | 6.82 | | | |
| 22 | 139.45 | 2.64 | 1.80100 (Na) | 35.0 (νa) | |
| 23 | -444.45 | 5.93 | | | |
| 24 | 355.88 | 1.36 | 1.69680 | 55.5 | |
| 25 | 32.204 | 6.10 | 1.64769 | 33.8 | |
| 26 | -101.23 | 0.51 | | | |
| 27 | -154.47 | 1.36 | 1.72825 | 28.5 | |
| 28 | 31.887 | 4.43 | 1.64769 | 33.8 | |
| 29 | 134.8 | 25.00 | | | 28.9 |
| 30 | ∞ | 2.00 | 1.51680 | 64.2 | |
| 31 | ∞ | | | | |

Si : SURFACE NUMBER
Ri : RADIUS OF CURVATURE
di : SURFACE SPACING
Ndj : REFRACTIVE INDEX
νdj : ABBE NUMBER
Dk : EFFECTIVE DIAMETER
VA : VARIABLE
AD : APERTURE DIAPHRAGM

FIG.8

| EXAMPLE 2 : VARIOUS DATA | | |
|---|---|---|
| f | 499.65 | |
| Bf | 71.45 | |
| Fno | 4.08 | |
| ANGLE OF VIEW : 2ω | 4.9 DEGREE | |
| | INFINITE POINT | NEAR POINT (5m) |
| d11 | 38.09 | 47.64 |
| d16 | 18.79 | 9.24 |
| f3 | 108.05 | |
| D1 | 122.6 | |
| D3 | 36.5 | |
| CE (1) | 1.377 | |
| CE (2) | 0.314 | |
| CE (3) | 1.84666 | |
| CE (4) | 35.4 | |
| CE (5) | 23.8 | |
| VPA | ± 0.25 DEGREE | |
| IMA | ± 2.18mm | |
| MAOVPG | ± 1.28mm | |
| IMA/MAOVPG | 1.7 TIMES | |

CE : CONDITIONAL EXPRESSION
VPA : VIBRATION PROOF AMOUNT
IMA : IMAGE MOVING AMOUNT
MAOVPG : MOVING AMOUNT OF VIBRATION PROOF GROUP
IMA/MAOVPG : IMAGE MOVING AMOUNT / MOVING AMOUNT OF
VIBRATION PROOF GROUP

FIG.9

| EXAMPLE 3: BASIC LENS DATA |||||||
|---|---|---|---|---|---|---|
| | Si | Ri | di | Ndj | νdj | Dk |
| G1 | 1 | 1500 | 5.00 | 1.51680 | 64.2 | 144.4 (D1) |
| | 2 | 1500 | 1.00 | | | |
| | 3 | 229.63 | 17.97 | 1.49782 | 82.5 | |
| | 4 | -1255.8 | 0.20 | | | |
| | 5 | 211.18 | 19.75 | 1.49782 | 82.5 | |
| | 6 | -578.89 | 1.48 | | | |
| | 7 | -576.21 | 6.00 | 1.77250 | 49.6 | |
| | 8 | 309.22 | 133.83 | | | |
| | 9 | 101.28 | 6.72 | 1.80400 | 46.6 | |
| | 10 | 67.542 | 17.55 | 1.49782 | 82.5 | |
| | 11 | 1128.5 | d11 (VA) | | | |
| G2 | 12 | -887.63 | 3.53 | 1.83481 | 42.7 | |
| | 13 | 73.517 | 3.93 | | | |
| | 14 | -203.2 | 5.88 | 1.84666 | 23.8 | |
| | 15 | -44.863 | 3.51 | 1.67003 | 47.2 | |
| | 16 | 163.11 | d16 (VA) | | | |
| | 17 (AD) | ∞ | 5.00 | | | |
| G3 G3a | 18 | 93.509 | 7.55 | 1.48749 (Nb) | 70.4 (νb) | 43.0 (D3) |
| | 19 | -65.746 | 1.96 | | | |
| | 20 | -64.635 | 1.50 | 1.84666 (Nc) | 23.8 (νc) | |
| | 21 | -166.58 | 8.02 | | | |
| | 22 | 164.06 | 3.16 | 1.80100 (Na) | 35.0 (νa) | |
| | 23 | -499.23 | 13.97 | | | |
| G3b | 24 | -124.37 | 2.10 | 1.67790 | 55.4 | |
| | 25 | 48.554 | 9.30 | 1.64769 | 33.8 | |
| | 26 | -95.577 | 0.68 | | | |
| | 27 | -392.34 | 2.10 | 1.75520 | 27.5 | |
| | 28 | 42.712 | 6.90 | 1.64769 | 33.8 | |
| | 29 | 950.49 | 22.00 | | | 32.8 |
| GF | 30 | ∞ | 2.00 | 1.51680 | 64.2 | |
| | 31 | ∞ | | | | |

Si : SURFACE NUMBER
Ri : RADIUS OF CURVATURE
di : SURFACE SPACING
Ndj : REFRACTIVE INDEX
νdj : ABBE NUMBER
Dk : EFFECTIVE DIAMETER
VA : VARIABLE
AD : APERTURE DIAPHRAGM

FIG.10

| EXAMPLE 3 : VARIOUS DATA | | |
|---|---|---|
| f | 587.63 | |
| Bf | 85.93 | |
| Fno | 4.08 | |
| ANGLE OF VIEW : 2ω | 4.2 DEGREE | |
| | INFINITE POINT | NEAR POINT (6m) |
| d11 | 58.87 | 69.92 |
| d16 | 21.38 | 10.33 |
| f3 | 134.36 | |
| D1 | 144.4 | |
| D3 | 43 | |
| CE (1) | 1.302 | |
| CE (2) | 0.314 | |
| CE (3) | 1.84666 | |
| CE (4) | 35.4 | |
| CE (5) | 23.8 | |
| VPA | ± 0.25 DEGREE | |
| IMA | ± 2.56mm | |
| MAOVPG | ± 1.51mm | |
| IMA/MAOVPG | 1.7 TIMES | |

CE : CONDITIONAL EXPRESSION
VPA : VIBRATION PROOF AMOUNT
IMA : IMAGE MOVING AMOUNT
MAOVPG : MOVING AMOUNT OF VIBRATION PROOF GROUP
IMA/MAOVPG : IMAGE MOVING AMOUNT / MOVING AMOUNT OF VIBRATION PROOF GROUP

FIG.11

| EXAMPLE 4: BASIC LENS DATA ||||||
|---|---|---|---|---|---|
| Si | Ri | di | Ndj | νdj | Dk |
| 1 | 1500 | 5.00 | 1.51680 | 64.2 | 144.4 (D1) |
| 2 | 1500 | 1.00 | | | |
| 3 | 212.95 | 19.56 | 1.49782 | 82.5 | |
| 4 | -1200.2 | 16.26 | | | |
| 5 | 231.7 | 18.72 | 1.49782 | 82.5 | |
| 6 | -495.18 | 1.10 | | | |
| 7 | -484.83 | 6.00 | 1.78800 | 47.4 | |
| 8 | 374.64 | 116.40 | | | |
| 9 | 114.36 | 6.07 | 1.69680 | 55.5 | |
| 10 | 67.94 | 15.90 | 1.49782 | 82.5 | |
| 11 | 543.89 | d11 (VA) | | | |
| 12 | -4315.9 | 3.60 | 1.83400 | 37.2 | |
| 13 | 86.167 | 5.17 | | | |
| 14 | -142.05 | 5.71 | 1.84666 | 23.8 | |
| 15 | -53.067 | 3.60 | 1.69680 | 55.5 | |
| 16 | 2027.9 | d16 (VA) | | | |
| 17 (AD) | ∞ | 8.40 | | | |
| 18 | 431.25 | 7.41 | 1.48749 (Nb) | 70.4 (νb) | 51.6 (D3) |
| 19 | -72.216 | 0.76 | | | |
| 20 | -72.861 | 2.16 | 1.84666 (Nc) | 23.8 (νc) | |
| 21 | -177 | 9.43 | | | |
| 22 | 190.04 | 4.59 | 1.80100 (Na) | 35.0 (νa) | |
| 23 | -373.94 | 34.91 | | | |
| 24 | 270.68 | 1.94 | 1.72342 | 38.0 | |
| 25 | 66.093 | 0.33 | | | |
| 26 | 67.851 | 6.46 | 1.62004 | 36.3 | |
| 27 | -1071.2 | 3.24 | | | |
| 28 | 187.03 | 2.40 | 1.62041 | 60.3 | |
| 29 | 92.326 | 44.00 | | | 38.2 |
| 30 | ∞ | 2.00 | 1.51680 | 64.2 | |
| 31 | ∞ | | | | |

Si : SURFACE NUMBER
Ri : RADIUS OF CURVATURE
di : SURFACE SPACING
Ndj : REFRACTIVE INDEX
νdj : ABBE NUMBER
Dk : EFFECTIVE DIAMETER
VA : VARIABLE
AD : APERTURE DIAPHRAGM

FIG.12

| EXAMPLE 4 : VARIOUS DATA | | |
|---|---|---|
| f | 590.36 | |
| Bf | 84.94 | |
| Fno | 4.08 | |
| ANGLE OF VIEW : 2ω | 4.2 DEGREE | |
| | INFINITE POINT | NEAR POINT (6m) |
| d11 | 47.05 | 60.12 |
| d16 | 28.81 | 15.74 |
| f3 | 159.88 | |
| D1 | 144.4 | |
| D3 | 51.6 | |
| CE (1) | 1.319 | |
| CE (2) | 0.314 | |
| CE (3) | 1.84666 | |
| CE (4) | 35.4 | |
| CE (5) | 23.8 | |
| VPA | ± 0.25 DEGREE | |
| IMA | ± 2.58mm | |
| MAOVPG | ± 1.84mm | |
| IMA/MAOVPG | 1.4 TIMES | |

CE : CONDITIONAL EXPRESSION
VPA : VIBRATION PROOF AMOUNT
IMA : IMAGE MOVING AMOUNT
MAOVPG : MOVING AMOUNT OF VIBRATION PROOF GROUP
IMA/MAOVPG : IMAGE MOVING AMOUNT / MOVING AMOUNT OF
    VIBRATION PROOF GROUP

FIG.13

EXAMPLE 1

EXAMPLE 2

EXAMPLE 3

EXAMPLE 4

EXAMPLE 1
ABERRATION BEFORE
VIBRATION PROOF
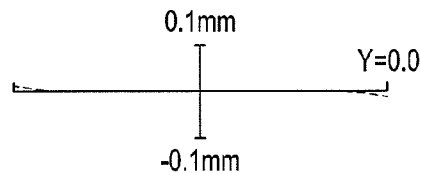
FIG.18A
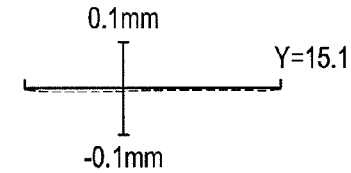
FIG.18B
FIG.18C
FIG.18D
FIG.18E
ABERRATION UPON VIBRATION
PROOF (0.25 DEGREE)
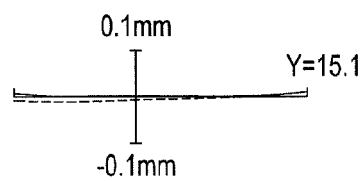
FIG.18F
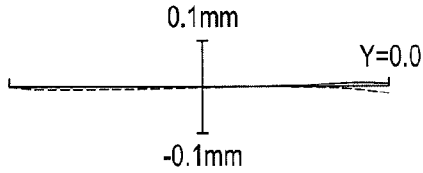
FIG.18G
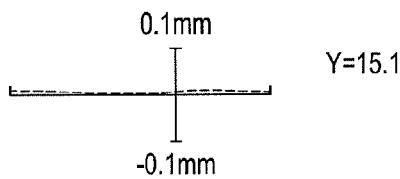
FIG.18H
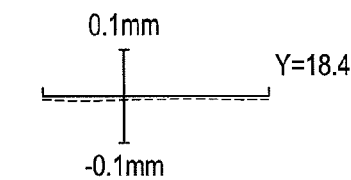
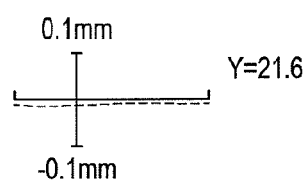
—— d-LINE
----- g-LINE
--- C-LINE

EXAMPLE 2

ABERRATION BEFORE
VIBRATION PROOF

ABERRATION UPON VIBRATION
PROOF (0.25 DEGREE)

—— d-LINE
----- g-LINE
--- C-LINE

EXAMPLE 3

ABERRATION BEFORE VIBRATION PROOF

ABERRATION UPON VIBRATION PROOF (0.25 DEGREE)

—— d-LINE
----- g-LINE
— — C-LINE

EXAMPLE 4

ABERRATION BEFORE
VIBRATION PROOF

ABERRATION UPON VIBRATION
PROOF (0.25 DEGREE)

——— d-LINE
- - - - g-LINE
— — — C-LINE

LENS HAVING VIBRATION PROOF FUNCTION AND IMAGING APPARATUS

This application is based on and claims priority under 35 U.S.C §119 from Japanese Patent Application No. 2008-018093, filed on Jan. 29, 2008, the entire disclosure of which is herein incorporated by reference.

BACKGROUND OF THE INVENTION

1. Field of the Invention

The present invention relates to a vibration proof optical system and, in particular, relates to a telephoto lens to be mounted on a film camera or an electronic camera using an imaging device such as a CCD (charge coupled device) and relates to an imaging apparatus which mounts the telephoto lens as an imaging lens system.

2. Description of Related Art

There is known a method in which a part of lenses within an optical system is moved in a direction orthogonal to an optical axis in order to correct the image vibration of a taken image, caused by the vibration of the optical system due to hand movement. Japanese Patent No. 3590845 discloses the invention of an image position correcting optical system which includes a first lens group G1 having a positive refractive power, a second lens group G2 having a negative refractive power and a third lens group G3 having a positive refractive power in the order from the object side, wherein the second lens group G2 is moved along the optical axis to perform the focusing and the image correction group G3S of the third lens group G3 is moved in the direction orthogonal to the optical axis to correct the image position.

In a telephoto lens, chromatic aberration degrades as the focal length becomes longer and the optical system is made smaller. Further, the weight of the telephoto lens increases as the focal length becomes longer and so the image vibration due to the hand movement will be caused at the time of imaging. However, when a vibration proof mechanism for correcting the image vibration due to hand movement is employed, the lenses become larger. The vibration proof optical system of the related art requires lenses of a relatively large diameter so that the vibration proof lens group does not shade a light flux when the vibration proof lens group moves vertically with respect to the optical axis at the time of absorbing the vibration. Further, at the time of absorbing the vibration, since the lens system becomes nonrotational symmetry, there may arise such phenomena that the chromatic aberration etc. appear at the center portion of a screen and an image plane falls down at the periphery of a screen. To this end, there has been desired to develop a vibration proof optical system which is less in the degradation degree of performance at the time of absorbing the vibration while suppressing the diameter of the vibration proof lens group to the minimum value.

In the optical system described in Japanese Patent No. 3590845, a ratio between the moving amount of the vibration proof lens group and the moving amount of an image at an imaging plane is almost 1. However, in the case of a longer focal length, the vibration proof effects can be attained more effectively with a small moving amount when the ratio of the moving amount of an image with respect to the moving amount of the vibration proof lens group is set to be larger than 1. Further, the vibration proof mechanism can be further miniaturized when the moving amount at the time of the vibration proof is smaller. Furthermore, the patent document 1 discloses only one embodiment in which the entirety of the third lens group G3 is set as the image correction group G3S. Japanese Patent No. 3590845 does not concretely disclose as to a case where a part of the lenses of the third lens group G3 is set as the image correction group G3S. That is, Japanese Patent No. 3590845 does not explain concretely as to how a part of the lenses of the third lens group G3 is to be optimized as the image correction group G3S.

SUMMARY OF THE INVENTION

An object of an illustrative, non-limiting embodiment of the invention is to provide a telephoto lens, which can attain vibration proof effects effectively with a small moving amount and can employ a vibration proof mechanism of a relatively small size while suppressing the diameter of the lenses of a vibration proof lens group, and also provide an imaging apparatus, which includes the telephoto lens and can perform an imaging operation stably.

According to an aspect of the invention, there is provided a lens having a vibration proof function including: in order from the object side, a first lens group having a positive refractive power, a second lens group having a negative refractive power, and a third lens group having a positive refractive power. The second lens group is moved along the optical axis to perform focusing. The third lens group includes a 3a-th group having a positive refractive power and a 3b-th group having a negative refractive power in the order from the object side, and the 3a-th group is moved in a direction orthogonal to the optical axis to correct an image vibration of a taken image. Further, a following conditional expression is satisfied:

$$1.1 < (f \cdot D3)/(D1 \cdot f3) < 1.4 \quad (1)$$

where f represents a focal length of the entire system, f3 represents a focal length of the third lens group, D1 represents a maximum effective diameter of a surface on a most object side of the first lens group, and D3 represents a maximum effective diameter of a surface on the most object side of the third lens group in view of a case of vibration proof.

An imaging apparatus according to an aspect of the invention includes the lens as an imaging lens system.

In the lens, which is configured by three groups as a whole, the third lens group may includes the 3a-th group having a positive refractive power and the 3b-th group having a negative refractive power in order from the object side, and the 3a-th group is configured as the lens group for the vibration proof, whereby the vibration proof can be attained effectively with a small moving amount. Further, the lens diameter of the lens group for the vibration proof can be easily suppressed to a small value. In particular, when the conditional expression (1) is satisfied, the enlargement of the lens diameter can be suppressed while preventing that a light flux is shaded by the lens group for the vibration proof at the time of the vibration proof.

Further, an object of the invention can be more likely realized when the following preferable conditions are suitably and selectively satisfied. Furthermore, the optical system can be realized in which the degradation of the performance at the time of the vibration proof is suppressed.

In the lens, the 3a-th group may include at least two positive lenses and one negative lens, and the 3b-th group may include at least one positive lens and two negative lenses.

When a positive lens having the highest refractive index among positive lenses in the 3a-th group is referred to as a positive lens La and a positive lens having the lowest refractive index among positive lenses in the 3a-th group is referred to as a positive lens Lb and a negative lens having the highest refractive index among negative lenses in the 3a-th group is referred to as a negative lens Lc, the following conditional expressions may be satisfied:

$$Na-Nb>0.3 \quad (2)$$

$$Nc>1.7 \quad (3)$$

where Na represents a refractive index of the positive lens La at the d-line, Nb represents a refractive index of the positive lens Lb at the d-line, and Nc represents a refractive index of the positive lens Lc at the d-line.

Further, the following conditional expressions may be satisfied:

$$30<vb-va<60 \quad (4)$$

$$vc<30 \quad (5)$$

where va represents an Abbe number of the positive lens La, vb represents an Abbe number of the positive lens Lb, and vc represents an Abbe number of the negative lens Lc.

Further, the 3a-th group may include a first biconvex lens, a negative meniscus lens having a concave surface on the object side, and a second biconvex lens, in order from the object side.

BRIEF DESCRIPTION OF THE DRAWINGS

The features of the invention will appear more fully upon consideration of the exemplary embodiment of the invention, which are schematically set forth in the drawings, in which:

FIG. 6 is a diagram showing basic lens data of the telephoto lens according to Example 1;

FIG. 7 is a diagram showing the various data of the telephoto lens according to Example 1;

FIG. 8 is a diagram showing basic lens data of the telephoto lens according to Example 2;

FIG. 9 is a diagram showing the various data of the telephoto lens according to Example 2;

FIG. 10 is a diagram showing basic lens data of the telephoto lens according to Example 3;

FIG. 11 is a diagram showing the various data of the telephoto lens according to Example 3;

FIG. 12 is a diagram showing basic lens data of the telephoto lens according to Example 4;

FIG. 13 is a diagram showing the various data of the telephoto lens according to Example 4;

FIGS. 14A to 14C are aberration diagrams showing various aberrations of the telephoto lens according to Example 1, in which FIG. 14A shows spherical aberration, FIG. 14B shows astigmatism and FIG. 14C shows distortion;

FIGS. 15A to 15C are aberration diagrams showing various aberrations of the telephoto lens according to Example 2, in which FIG. 15A shows spherical aberration, FIG. 15B shows astigmatism and FIG. 15C shows distortion;

FIGS. 16A to 16C are aberration diagrams showing various aberrations of the telephoto lens according to Example 3, in which FIG. 16A shows spherical aberration, FIG. 16B shows astigmatism and FIG. 16C shows distortion;

FIGS. 17A to 17C are aberration diagrams showing various aberrations of the telephoto lens according to Example 4, in which FIG. 17A shows spherical aberration, FIG. 17B shows astigmatism and FIG. 17C shows distortion;

FIGS. 18A to 18H are aberration diagrams showing lateral aberrations of the telephoto lens according to Example 1, in which FIG. 18A to 18E show lateral aberrations in a state before the vibration proof and FIG. 18F to 18H show lateral aberrations at the time of the vibration proof;

FIGS. 19A to 19H are aberration diagrams showing lateral aberrations of the telephoto lens according to Example 2, in which FIG. 19A to 19E show lateral aberrations in a state before the vibration proof and FIG. 19F to 19H show lateral aberrations at the time of the vibration proof;

FIGS. 20A to 20H are aberration diagrams showing lateral aberrations of the telephoto lens according to Example 3, in which FIG. 20A to 20E show lateral aberrations in a state before the vibration proof and FIG. 20F to 20H show lateral aberrations at the time of the vibration proof; and FIGS. 21A to 21H are aberration diagrams showing lateral aberrations of the telephoto lens according to Example 4, in which FIG. 21A to 21E show lateral aberrations in a state before the vibration proof and FIG. 21F to 21H show lateral aberrations at the time of the vibration proof;

DETAILED DESCRIPTION OF THE EXEMPLARY EMBODIMENTS

In a telephoto lens having the vibration proof function or an imaging apparatus according to an exemplary embodiment of the invention, in which the telephoto lens is configured by three groups as a whole, the third lens group is configured by the 3a-th group G3a having a positive refractive power and the 3b-th group G3b having a negative refractive power in order from the object side, and the 3a-th group G3a is configured as the lens group for the vibration proof and the configuration thereof is optimized, whereby the vibration proof can be attained effectively with a small moving amount. Further, the lens diameter of the vibration proof lens group is suppressed to a small value and so the vibration proof mechanism of a relatively small size can be employed.

Further, according to an imaging apparatus according of the invention, since a telephoto lens according to the invention is included, the imaging operation can be performed stably also at the time of the vibration proof.

An exemplary embodiment of the invention will be explained in detail with reference to drawings.

Figure 1:
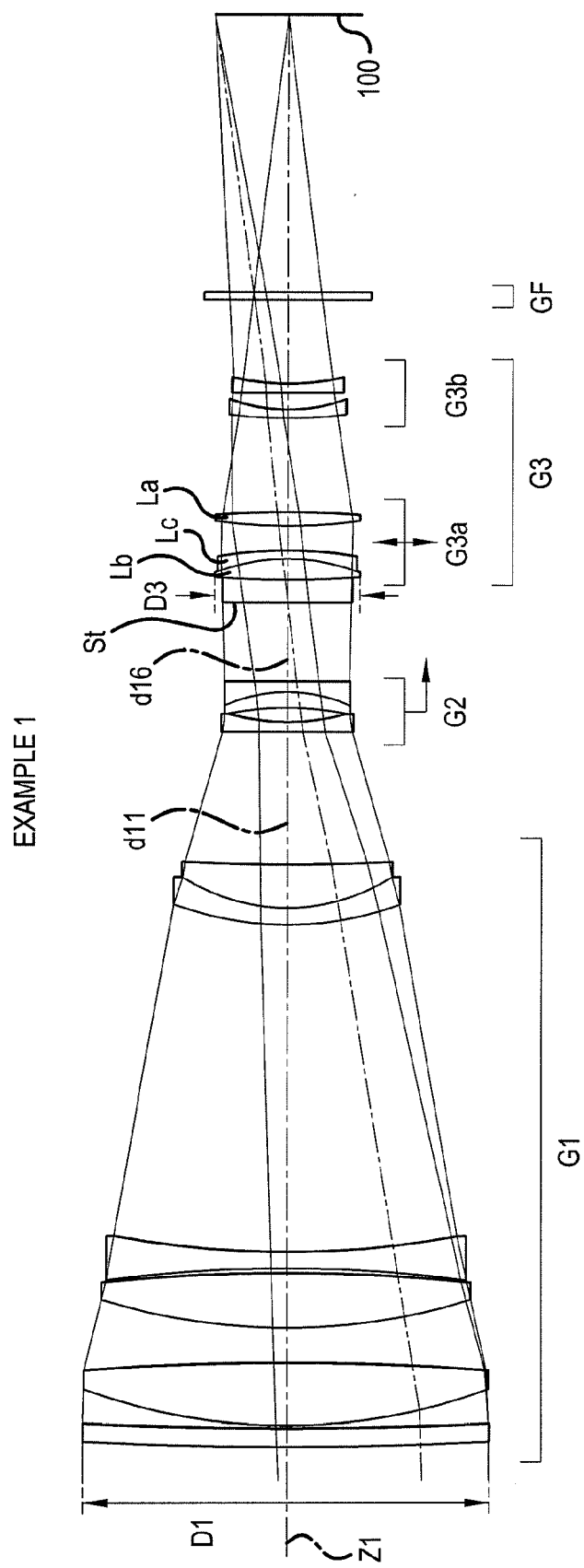
FIG. 1 is a diagram showing a first configuration example of a telephoto lens according to an exemplary embodiment of the invention, which shows a sectional diagram of lenses corresponding to Example 1.
Figure 2:
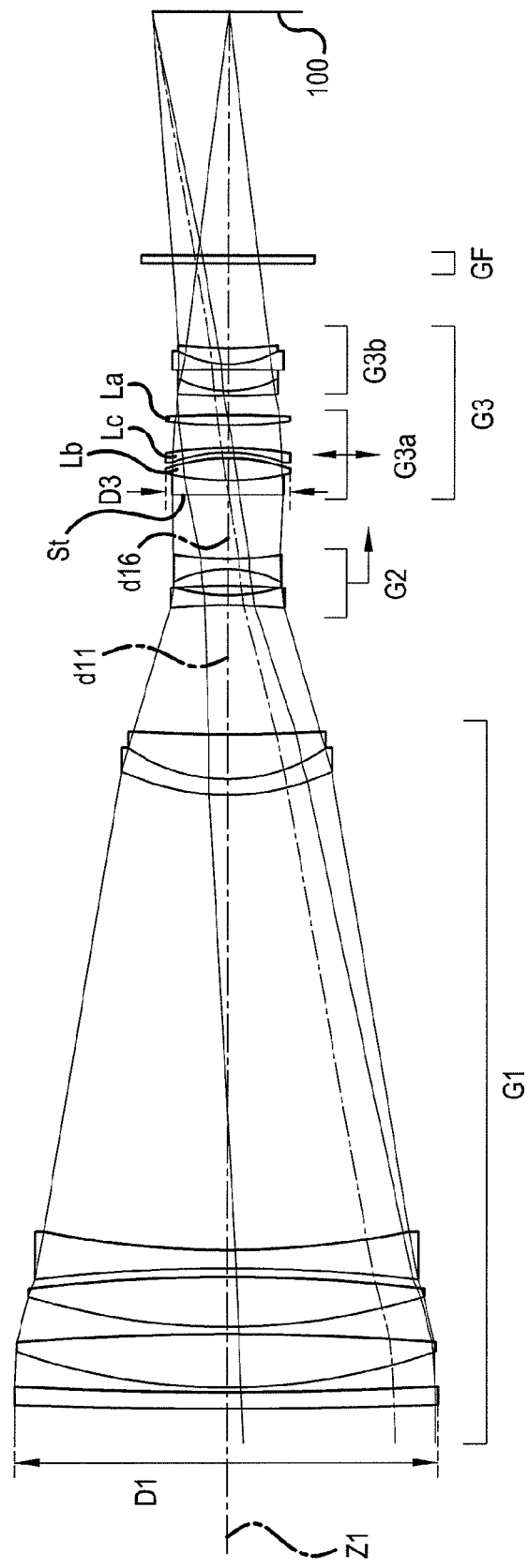
FIG. 2 is a diagram showing a second configuration example of a telephoto lens according to an exemplary embodiment of the invention, which shows a sectional diagram of lenses corresponding to Example 2.
Figure 3:
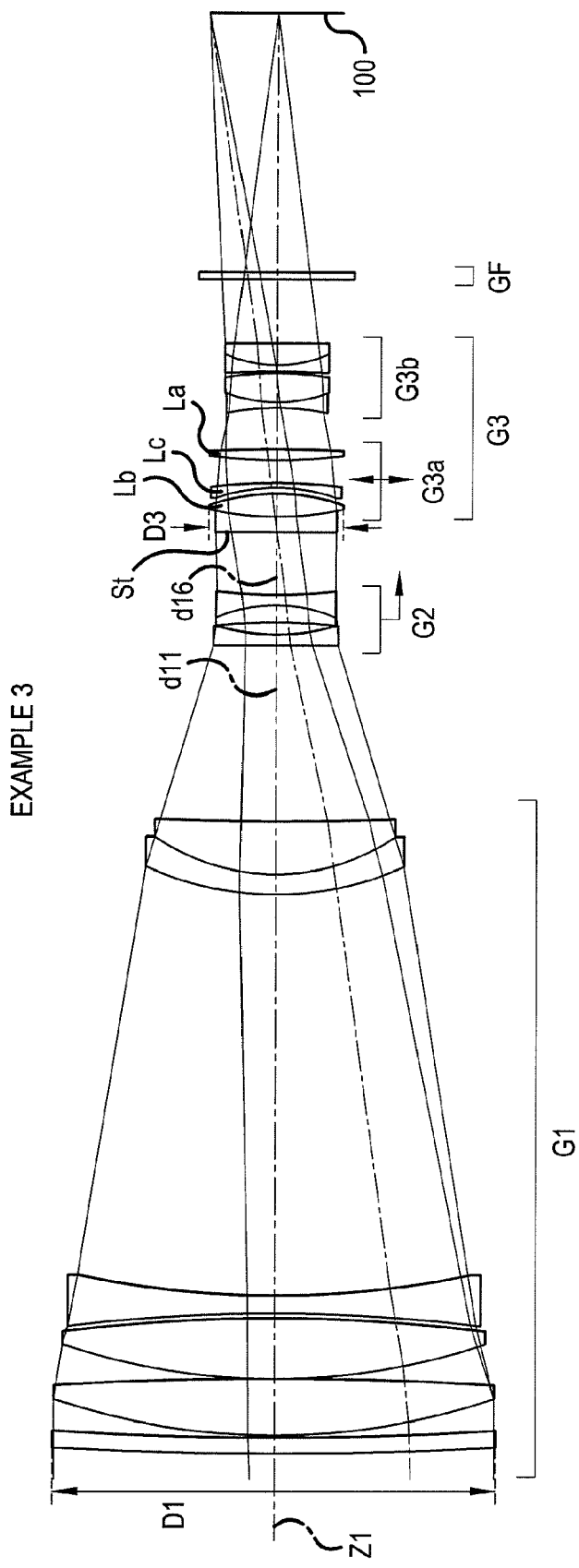
FIG. 3 is a diagram showing a third configuration example of a telephoto lens according to an exemplary embodiment of the invention, which shows a sectional diagram of the lenses corresponding to Example 3.
Figure 4:
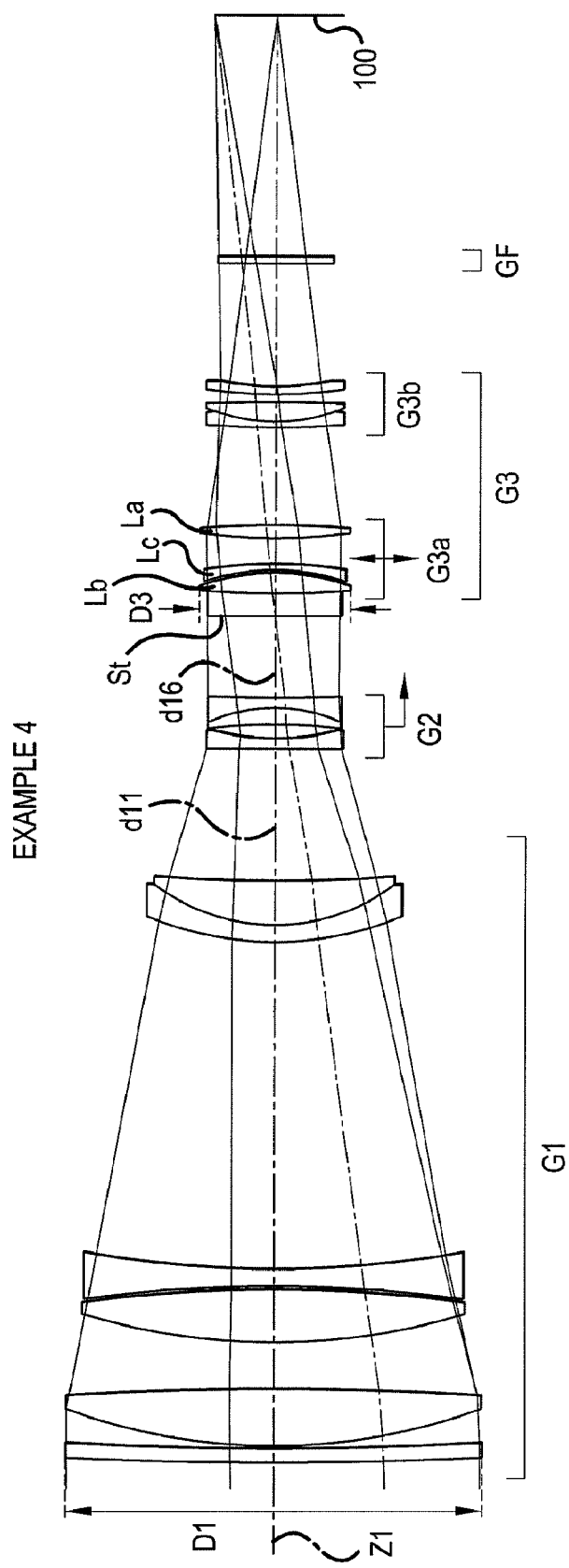
FIG. 4 is a diagram showing a fourth configuration example of a telephoto lens according to an exemplary embodiment of the invention, which shows a sectional diagram of the lenses corresponding to Example 4.

FIG. 1 is a first configuration example of a telephoto lens according to an exemplary embodiment of the invention. This configuration example corresponds to the lens configuration of the first numerical example described later (FIGS. 6 and 7). Similarly, FIGS. 2 to 4 show the sectional configurations of the second to fourth configuration examples corresponding to the lens configurations of the second to fourth numerical examples described later, respectively. Each of FIGS. 1 to 4 shows the lens arrangement in a state of focusing on an object located at an infinite point. In each of FIGS. 1 to 4, a symbol di represents a surface spacing between an i-th surface and an (i+1)-th surface on the optical axis Z1. The symbol di is added only to the surface spacing which changes in accordance with the focusing operation.

The telephoto lens includes a first lens group G1 having a positive refractive power, a second lens group G2 having a negative refractive power and a third lens group G3 having a positive refractive power along the optical axis Z1 in order from the object side. An aperture diaphragm St is disposed between the second lens group G2 and the third lens group G3.

The telephoto lens can be mounted on an imaging apparatus such as a film camera, a video camera or an electronic still camera using an imaging device such as a CCD. On an image side of the telephoto lens, members corresponding to the configuration of the imaging portion of a camera to be mounted are disposed. For example, in the case of the electronic camera, an imaging device such as a CCD (charge coupled device) or a CMOS (complementary metal oxide semiconductor) is disposed on the image formation plane (imaging plane) of the telephoto lens. Further, an optical member GF such as one of various kinds of optical filters, a cover glass or a prism is disposed between the final lens group (third lens group G3) and the imaging plane.

In this telephoto lens, the first lens group G1 has a plurality of lenses and is fixed at the time of the vibration proof and the focusing. The second lens group G2 has a plurality of lenses and is a focus lens group. In the case of shifting the focal point from an infinite point to a near point, the second lens group G2 moves to the image side on the optical axis Z1 as shown in FIG. 1 etc.

The third lens group G3 is configured by a 3a-th group G3a having a positive refractive power and a 3b-th group G3b having a negative refractive power. The 3a-th group G3a is a vibration proof lens group and is configured to correct the image vibration of a taken image when moved in a direction orthogonal to the optical axis Z1 as shown in FIG. 1 etc.

The telephoto lens satisfies the following conditional expression:

$$1.1 < (f \cdot D3)/(D1 \cdot f3) < 1.4 \quad (1)$$

where f represents a focal length of the entire system, f3 represents a focal length of the third lens group G3, D1 represents a maximum effective diameter (see FIG. 1 etc.) of the surface on the most object side of the first lens group G1, and D3 represents a maximum effective diameter of the surface on the most object side of the third lens group G3 in view of the case of the vibration proof.

Figure 5A:
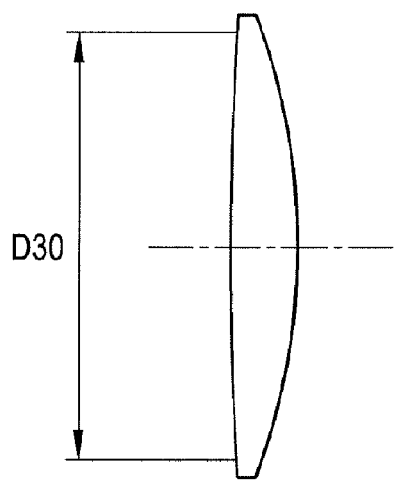
FIGS. 5A to 5C are diagrams for explaining the effective diameters of the moving group for vibration proof.
Figures 5B, 5C:
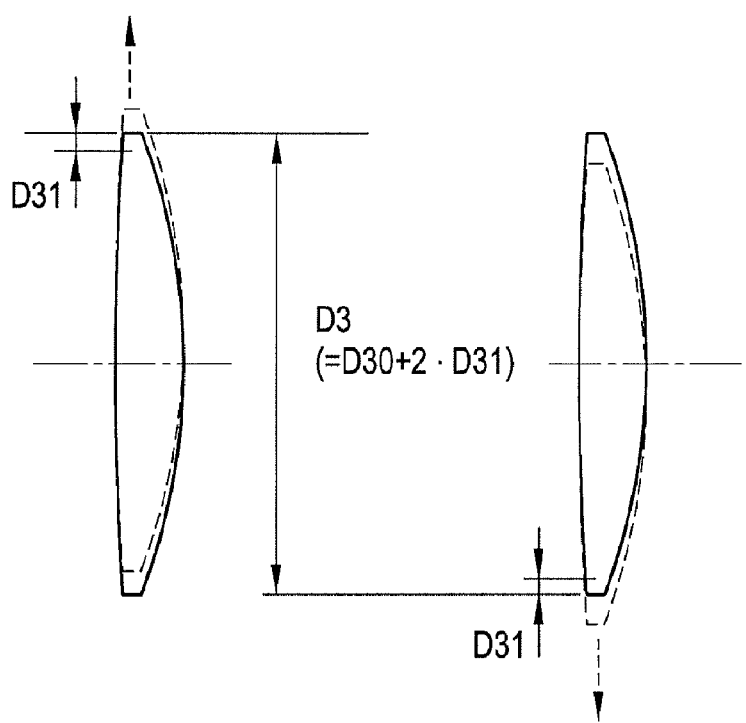

The effective diameter D3 in the aforesaid conditional expression (1) will be explained with reference to FIG. 5A to 5C. The most object side lens of the third lens group G3 is the most object side lens of the 3a-th group G3a which moves at the time of the vibration proof. The effective diameter of the most object side lens in a state before the movement at the time of the vibration proof is supposed to be D30 as shown in FIG. 5A. Further, the maximum moving amount of the lens at the time of the vibration proof with reference to the state before the movement upon the vibration proof is supposed to be D31. The moving amount of the lens becomes maximum at the time of the vibration proof in the following manner. That is, in the case where the lens moves in the elevational direction, for example, there is a case where the lens moves to the upper direction with the moving amount D31 (FIG. 5B) and a case where the lens moves to the lower direction with the moving amount D31 (FIG. 5C). In order not to shade a light flux also at the time of the vibration proof, it is required to design the diameter of the lens in view of both the movements in the upper and lower directions. In this case, "the maximum effective diameter in view of the vibration proof" represents a value which is a sum of the effective diameter D30 (FIG. 5A) in the state before the movement upon the vibration proof, the maximum moving amount D31 (FIG. 5B) in the upper direction and the maximum moving amount D31 (FIG. 5C) in the lower direction. That is, the total value D3 is represented by the following expression.

$$D3 = D30 + 2 \cdot D31$$

In this telephoto lens, preferably, the 3a-th group G3a is configured by at least two positive lenses and one negative lens and the 3b-th group G3b is configured by at least one positive lens and two negative lenses. For example, preferably, the 3a-th group G3a is configured by a first biconvex lens, a negative meniscus lens having a concave surface on the object side and a second biconvex lens, in order from the object side.

In the case where the 3a-th group G3a is configured by at least two positive lenses and one negative lens, in particular, supposing that the positive lens having the largest refractive index is La among the positive lenses of the 3a-th group G3a and the positive lens having the smallest refractive index is Lb among the positive lenses of the 3a-th group G3a and that the negative lens having the largest refractive index is Lc among the negative lenses of the 3a-th group G3a, it is desirable that the following conditional expressions are suitably and selectively satisfied.

In the configuration examples of FIGS. 1 to 4, the 3a-th group G3a is configured by the first biconvex lens, the negative meniscus lens and the second biconvex lens in order from the object side. Among these lenses, the first biconvex lens corresponds to the positive lens Lb having the smallest refractive index, the second biconvex lens corresponds to the positive lens La having the largest refractive index and the negative meniscus lens corresponds to the negative lens Lc having the largest refractive index.

$$Na - Nb > 0.3 \quad (2)$$

$$Nc > 1.7 \quad (3)$$

$$30 < vb - va < 60 \quad (4)$$

$$vc < 30 \quad (5)$$

where Na represents a refractive index of the positive lens La at the d-line, Nb represents a refractive index of the positive lens Lb at the d-line, Nc represents a refractive index of the positive lens Lc at the d-line, va represents an Abbe number of the positive lens La, vb represents an Abbe number of the positive lens Lb, and vc represents an Abbe number of the negative lens Lc.

Next, the explanation will be made as to the action and effects of the telephoto lens thus configured.

According to this telephoto lens, in the telephoto lens entirely configured by the three groups, the third lens group G3 is configured by the 3a-th group G3a having the positive refractive power and the 3b-th group G3b having the negative refractive power in order from the object side, and the 3a-th group G3a is configured as the lens group for the vibration proof, whereby the vibration proof can be attained effectively with a small moving amount. Further, the lens diameter of the lens group for the vibration proof can be easily suppressed to a small value. In particular, when the conditional expression (1) is satisfied, the enlargement of the lens diameter can be suppressed while preventing that a light flux is shaded by the lens group for the vibration proof at the time of the vibration proof. Further, the degradation of the performance at the time of the vibration proof can be suppressed when the conditional expressions (2), (3), (4) and (5) are suitably and selectively satisfied.

When the value of the conditional expression (1) falls below the lower limit thereof, a light flux is shaded by the lens group 3a-th group G3a for the vibration proof at the time of the vibration proof. In contrast, when the value of the conditional expression (1) exceeds the upper limit thereof, since the diameter of the lens group for the vibration proof becomes large, the lens group having a large weight is required to be moved and so the vibration proof mechanism becomes large. For example, an actuator for the vibration proof becomes large.

The conditional expressions (2) and (3) define the relation of suitable refractive indexes of the respective lenses constituting the 3a-th group G3a. When the conditional expression (2) or (3) is not satisfied, the image plane variation at the time of the vibration proof can not be suppressed and so the degradation of the performance likely occurs at the time of the vibration proof.

The conditional expressions (4) and (5) define the relation of suitable Abbe numbers of the respective lenses constituting the 3a-th group G3a. When the conditional expression (4) or (5) is not satisfied, the variation of the lateral chromatic aberration at the time of the vibration proof can not be suppressed and so the degradation of the performance likely occurs at the time of the vibration proof.

As explained above, according to a telephoto lens of the embodiment, the vibration proof effects can be attained more effectively with a small moving amount. Further, since the lens diameter of the vibration proof lens group can be suppressed, the vibration proof mechanism of a relatively small size can be employed. Furthermore, when the telephoto lens according to the embodiment is mounted on the imaging apparatus, an imaging operation can be performed stably even at the time of the vibration proof.

Examples

Next, concrete numeral examples in a telephoto lens according to the embodiment will be explained. Hereinafter, plural examples will be explained collectively.

FIG. 6 shows Example 1 of concrete lens data corresponding to the configuration of the telephoto lens shown in FIG. 1. The column of a surface No. Si of the lens data shown in FIG. 6 represents i-th surface number of the telephoto lens acceding to Example 1 in a manner that the surface of the constituent element on the most object side is the first surface and the number increases sequentially toward the object side. The column of a radius of curvature Ri represents a value (mm) of the radius of curvature of the i-th surface from the object side. Similarly, the column of a surface spacing di represents a space (mm) on the optical axis between the i-th surface Si and the (i+1)-th surface Si+1 from the object side. The column of Ndj represents a value of a refractive index at the d-line (wavelength 587.6 nm) of the j-th optical element from the object side. The column of vdj represents a value of the Abbe number at the d-line of the j-th optical element from the object side. Further, the column of Dk represents effective diameters corresponding to D1 and D3 of the conditional expression (1).

In the telephoto lens according to Example 1, since the second lens group G2 moves on the optical axis in accordance with focusing operation, the values of the surface spacings d11, d16 before and after the second lens group G2 are variable.

FIG. 7 shows a focal length f (mm), a back focal length Bf (mm), an Fno (F value) and an angle of view 2ω of the entire system, as various kinds of data of the telephoto lens according to Example 1. Further, this figure shows the values of the surface spacings d11, d16 at the time of focusing on an object at the infinity point and a near point, respectively. Further, values relating to the aforesaid conditional expressions are shown. As shown in FIG. 7, the telephoto lens according to Example 1 satisfies the conditions of the aforesaid respective conditional expressions. FIG. 7 further shows, as data relating to the vibration proof, a vibration proof amount, an image moving amount, a moving amount of the vibration proof group (3b-th group G3b) and a ratio of the image moving amount with respect to the moving amount of the vibration proof group. In the telephoto lens according to Example 1, since the image moving amount is 1.4 times as large as the moving amount of the vibration proof group, the vibration proof effects can be attained more effectively with a small moving amount of the vibration proof group.

In the similar manner as Example 1, FIGS. 8 and 9 show concrete lens data corresponding to the configuration of the telephoto lens shown in FIG. 2 as Example 2. In the similar manner, FIGS. 10 and 11 show concrete lens data corresponding to the configuration of the telephoto lens shown in FIG. 3 as Example 3. Further, in the similar manner, FIGS. 12 and 13 show concrete lens data corresponding to the configuration of the telephoto lens shown in FIG. 4 as Example 4.

Like Example 1, in the telephoto lens according to each of Examples 2 to 4, since the second lens group G2 moves on the optical axis in accordance with focusing operation, the values of the surface spacings d11, d16 before and after the second lens group G2 are variable. In the telephoto lens according to each of the examples 2 to 4, since the ratio of the image moving amount with respect to the moving amount of the vibration proof group is more than 1, the vibration proof effects can be attained more effectively with a small moving amount of the vibration proof group like Example 1. Further, the telephoto lens according to each of Examples 2 to 4 satisfies the conditions of the aforesaid respective conditional expressions.

Figure 14A:
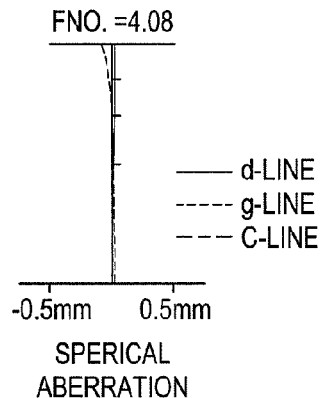
Figure 14B:
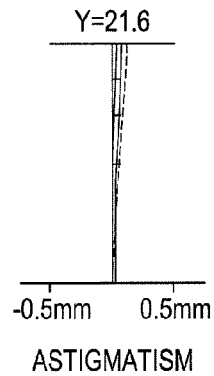
Figure 14C:
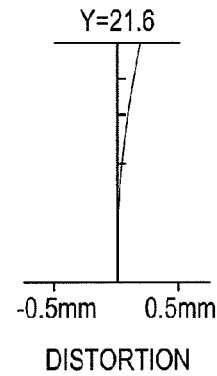

FIGS. 14A to 14C show spherical aberration, astigmatism and distortion before the vibration proof in a state of being focused on an object located at an infinite point in the telephoto lens according to Example 1, respectively. In the respective aberration diagrams, the aberrations at the g-line (wavelength 435.8 nm) and the C-line (wavelength 656.3 nm) using the d-line as a reference wavelength are also shown. In the astigmatism diagram, a steady line represents the aberration in the sagittal direction and a broken line represents the aberration in the tangential direction. Further, FNO represents F number and Y represents an image height.

Figure 15A:
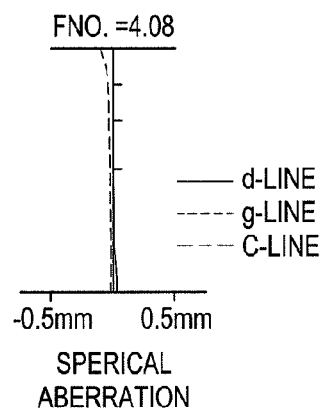
Figure 15B:
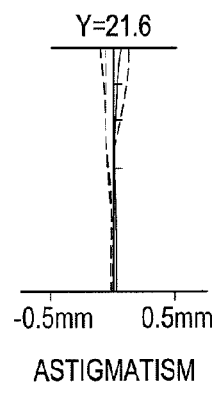
Figure 15C:
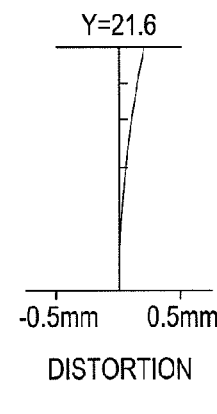
Figure 16A:
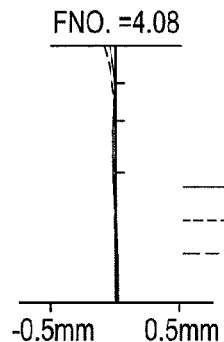
Figure 16B:
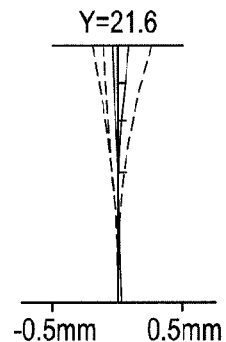
Figure 16C:
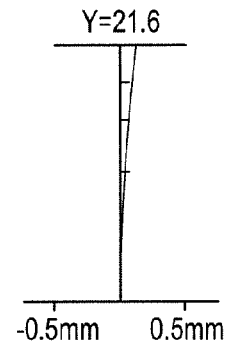
Figure 17A:
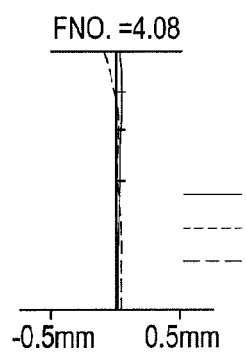
Figure 17B:
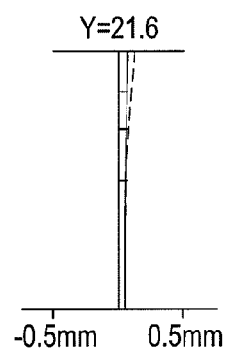
Figure 17C:
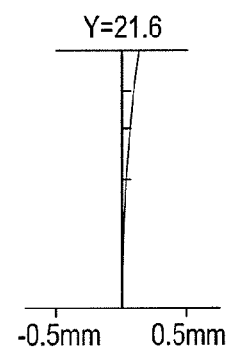
Figure 19A:
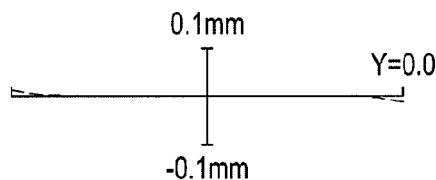
Figure 19B:
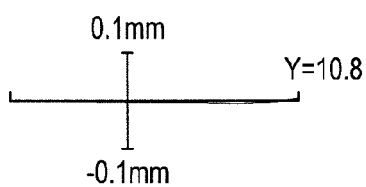
Figure 19F:
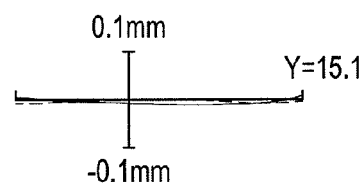
Figure 19C:
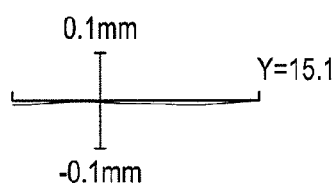
Figure 19G:
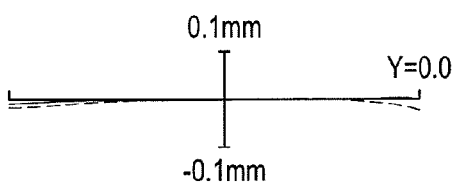
Figure 19D:
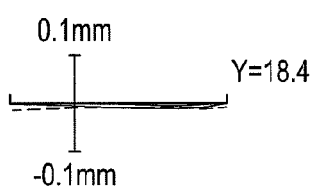
Figure 19H:
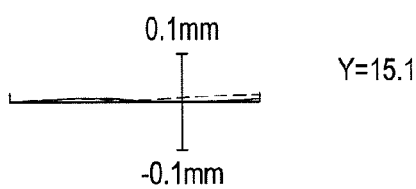
Figure 19E:
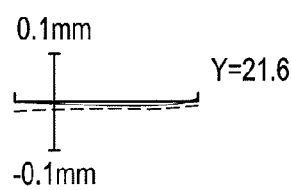
Figure 20A:
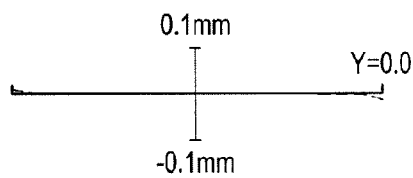
Figure 20B:
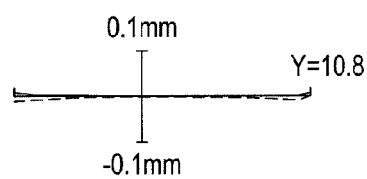
Figure 20F:
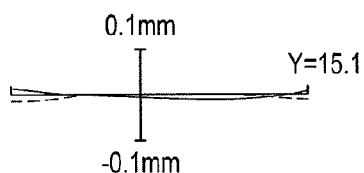
Figure 20C:
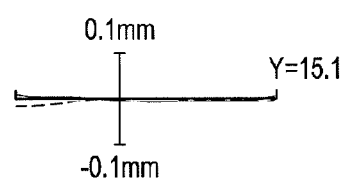
Figure 20G:
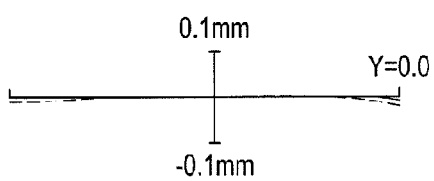
Figure 20D:
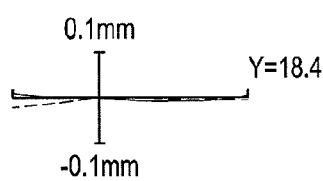
Figure 20H:
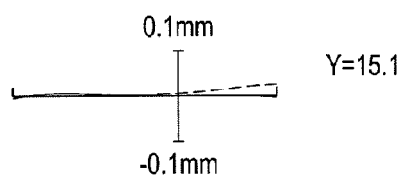
Figure 20E:
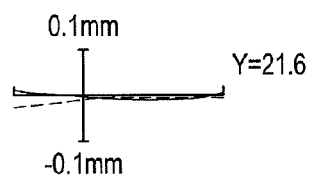
Figure 21A:
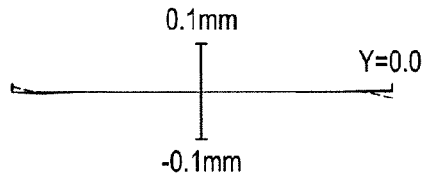
Figure 21B:
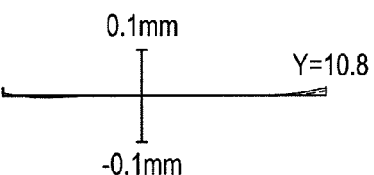
Figure 21F:
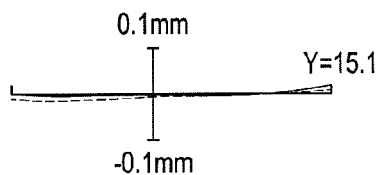
Figure 21C:
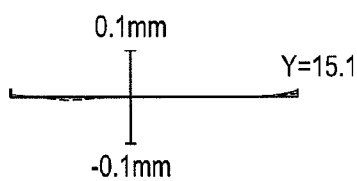
Figure 21G:
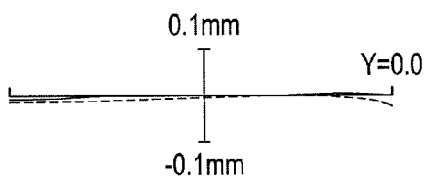
Figure 21D:
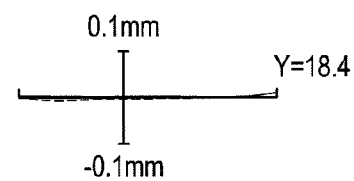
Figure 21H:
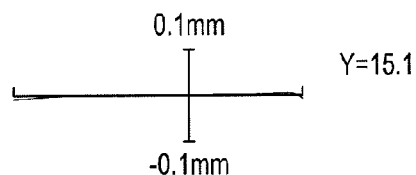
Figure 21E:
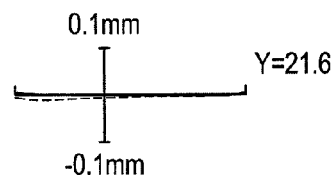

In the similar manner, FIGS. 15A to 15C show various kinds of aberrations before the vibration proof in the state of being focused on an object located at the infinite point in the telephoto lens according to Example 2. Similarly, FIGS. 16A to 16C show various kinds of aberrations before the vibration proof in the state of being focused on an object located at the infinite point in the telephoto lens according to Example 3. Similarly, FIGS. 17A to 17C show various kinds of aberrations before the vibration proof in the state of being focused on an object located at the infinite point in the telephoto lens according to Example 4.

FIGS. 18A to 18E and 18F to 18H show lateral aberrations in the state of being focused on an object located at the infinite point in the telephoto lens according to Example 1. In particular, FIGS. 18A to 18E show the lateral aberrations in the state before the vibration proof and FIGS. 18F to 18H show the lateral aberrations at the time of the vibration proof.

Similarly, FIGS. 19A to 19E and 19F to 19H show lateral aberrations in the state of being focused on an object located at the infinite point in the telephoto lens according to Example 2. Similarly, FIGS. 20A to 20E and 20F to 20H show lateral aberrations in the state of being focused on an object located at the infinite point in the telephoto lens according to Example 3. Further, similarly, FIGS. 21A to 21E and 21F to 21H show lateral aberrations in the state of being focused on an object located at the infinite point in the telephoto lens according to Example 4.

As clear from the respective numerical data and the respective aberration diagrams described above, in each of Examples, the vibration proof effects can be attained effectively with a small moving amount. Further, since the lens diameter of the vibration proof lens group can be suppressed to a small value, the telephoto lens which is less in the degradation degree of performance at the time of absorbing the vibration can be realized.

The invention is not limited to the aforesaid embodiment and the aforesaid respective Examples and may be varied in various manners. For example, the radii of curvature, the surface spacings and the refractive indexes etc. of the respective lens components are not limited to the values shown in the aforesaid respective examples and may take other values.

What is claimed is:

1. A lens having a vibration proof function, comprising: in order from an object side of the lens,
    a first lens group having a positive refractive power;
    a second lens group having a negative refractive power; and
    a third lens group having a positive refractive power, wherein
    the second lens group is moved along an optical axis thereof to perform focusing,
    the third lens group includes a 3a-th group having a positive refractive power and a 3b-th group having a negative refractive power in the order from the object side,
    the 3a-th group is moved in a direction orthogonal to the optical axis to correct an image vibration of a taken image, and
    the lens satisfies a conditional expression:

$$1.1 < (f \cdot D3)/(D1 \cdot f3) < 1.4 \quad (1)$$

wherein
    f represents a focal length of the lens,
    f3 represents a focal length of the third lens group,
    D1 represents a maximum effective diameter of a surface on a most object side of the first lens group, and
    D3 represents a maximum effective diameter of a surface on the most object side of the third lens group in view of a case of vibration proof.

2. The lens according to claim 1, wherein the 3a-th group includes, in order from the object side, a first biconvex lens, a negative meniscus lens having a concave surface on the object side, and a second biconvex lens.

3. An imaging apparatus comprising an imaging lens, the imaging lens being a lens according to claim 1.

4. The lens according to claim 1, wherein the 3a-th group includes least two positive lenses and one negative lens, and the 3b-th group includes at least one positive lens and two negative lenses.

5. The lens according to claim 4, wherein the 3a-th group includes, in order from the object side, a first biconvex lens, a negative meniscus lens having a concave surface on the object side, and a second biconvex lens.

6. The lens according to claim 4, further satisfying conditional expressions:

$$Na - Nb > 0.3 \quad (2)$$

$$Nc > 1.7 \quad (3)$$

wherein
    Na represents a refractive index of a positive lens La at the d-line, the positive lens La being a positive lens having the highest refractive index among positive lenses in the 3a-th group,
    Nb represents a refractive index of a positive lens Lb at the d-line, the positive lens Lb being a positive lens having the lowest refractive index among the positive lenses in the 3a-th group, and
    Nc represents a refractive index of a negative lens Lc at the d-line, the negative lens Lc being a negative lens having the highest refractive index among negative lenses in the 3a-the group.

7. The lens according to claim 6, wherein the 3a-th group includes, in order from the object side, a first biconvex lens, a negative meniscus lens having a concave surface on the object side, and a second biconvex lens.

8. The lens according to claim 6, further satisfying conditional expressions:

$$30 < vb - va < 60 \quad (4)$$

$$vc < 30 \quad (5)$$

wherein
    va represents an Abbe number of the positive lens La,
    vb represents an Abbe number of the positive lens Lb, and
    vc represents an Abbe number of the negative lens Lc.

9. The lens according to claim 8, wherein the 3a-th group includes, in order from the object side, a first biconvex lens, a negative meniscus lens having a concave surface on the object side, and a second biconvex lens.

* * * * *